United States Patent
Ito et al.

(10) Patent No.: US 7,436,378 B2
(45) Date of Patent: Oct. 14, 2008

(54) LED-SWITCHING CONTROLLER AND LED-SWITCHING CONTROL METHOD

(75) Inventors: Satoru Ito, Obu (JP); Seijun Nishimura, Nagoya (JP); Toshiya Fujiyama, Yamatokoriyama (JP)

(73) Assignees: AL-AID Corporation, Shinjuku-ku, Tokyo (JP); Sharp Kabushiki Kaisha, Osaka, Osaka (JP)

( * ) Notice: Subject to any disclaimer, the term of this patent is extended or adjusted under 35 U.S.C. 154(b) by 791 days.

(21) Appl. No.: 10/957,387

(22) Filed: Oct. 2, 2004

(65) Prior Publication Data

US 2005/0104542 A1  May 19, 2005

(51) Int. Cl.
 G09G 3/32 (2006.01)
 G09G 5/00 (2006.01)
 G09G 3/10 (2006.01)
(52) U.S. Cl. ..................... 345/82; 315/169.3
(58) Field of Classification Search .............. 345/82, 345/204, 83; 315/169.1, 169.3; 362/227, 362/800
See application file for complete search history.

(56) References Cited

U.S. PATENT DOCUMENTS

| 6,351,079 | B1 * | 2/2002 | Willis ................. 315/200 A |
| 6,466,188 | B1 * | 10/2002 | Cato ....................... 345/82 |
| 6,538,394 | B2 | 3/2003 | Volk et al. |
| 6,980,181 | B2 * | 12/2005 | Sudo ....................... 345/82 |
| 2004/0233144 | A1 * | 11/2004 | Rader et al ................ 345/82 |

* cited by examiner

*Primary Examiner*—Amr Awad
*Assistant Examiner*—Stephen G Sherman
(74) *Attorney, Agent, or Firm*—Peter Ganjian

(57) ABSTRACT

An LED terminal monitoring circuit detects an LED at the lowest potential among a plurality of parallel-connected LEDs. An analog signal selecting circuit gives a signal indicating the voltage of the detected LED to a boosting circuit. The boosting circuit performs a boosting operation on the basis of the condition of the detected LED at the lowest voltage and, consequently, a voltage sufficient for driving the LEDs in a current-control mode can be applied to all the LEDs. Signal lines not connected to LEDs are excluded from objects of a LED-switching control operation.

5 Claims, 5 Drawing Sheets

FIG. 3

| Step 1 | The main switch is closed |
|---|---|
| Step 2 | The LED terminal monitoring circuit 50 sends a constant current change signal Ictl to the constant-current circuit 40 |
| Step 3 | The boosting circuit starts a boosting operation upon the selection of an operation mode |
| Step 4-1 | The output voltage monitoring circuit 20 determines whether or not the output voltage Vout is equal to a predetermined maximum voltage |
| Step 4-2<br><br>Conditions:<br><br><br><br>Operations: | The LED terminal monitoring circuit 50 compares the voltages of the LEDs 31a to 31c with an LED not connected terminal determining voltage<br><br>1. The output voltage monitoring circuit 20 provides an output monitoring signal Prn on the basis of the output voltage Vout<br>2. All the potentials Vout - Va, Vout - Vb and Vout - Vc are higher than the LED not connected terminal determining voltage<br><br>The LED at the lowest one of the potentials Vout - Va, Vout - Vb and Vout - Vc among the connected LEDs 31a to 31c is selected, and an LED selection signal is given to the analog signal selecting circuit 60<br>A constant current change signal Ictl is given to the constant-current circuit 40 to supply a desired driving current Ireg to the LEDs |
| Step 5 | The analog signal selecting circuit 60 connects the signal line connected to the cathode of the LED specified by the minimum voltage selecting signal among the LEDs 31a to 31c to the LED terminal voltage input terminal Lin of the boosting circuit 10 |
| Step 6 | The boosting circuit 10 performs the boosting operation on the basis of the respective potentials of the LED terminal voltage input terminal Lin and the LED terminal control voltage input terminal Lstd | ps
LED-SWITCHING CONTROLLER AND LED-SWITCHING CONTROL METHOD

BACKGROUND OF THE INVENTION

1. Field of the Invention

The present invention relates to an LED-switching controller employing a booster for controlling switching parallel-connected LEDs 2. Description of the Related Art Recent various electronic devices including cellular phones are provided with a plurality of LEDs for indication and decoration. Cellular phones are subject to restrictions on the capacity of the power supply and most cellular phones are provided with a boosting circuit for switching on the LEDs. A prior art boosting circuit for switching a plurality of parallel-connected LEDs disclosed in U.S. Pat. No. 6,538,394 measures the voltage applied to a signal line connected to any one of the LEDs, and raises the measured voltage to a reference voltage for driving the LED in a current control mode. The reference voltage is determined taking into consideration the different forward voltages necessary for driving the plurality of individual LEDs in a current control mode. The reference voltage thus determined is often an excessively high voltage.

White LEDs have greatly different characteristics, respectively, and the LEDs cannot be driven so as to shine in luminances in a predetermined luminance range unless a voltage necessary for driving all the LEDs is applied to the LEDs. Therefore, even if a voltage necessary for driving some LED by a constant current is created by the boosting circuit, the voltage is not necessarily a voltage sufficient for driving other LEDs by a constant current, and it is possible that the respective luminances of the plurality of LEDs are distributed in a range wider than an allowable range or some of the plurality of LEDs cannot be switched on. Thus, a comparatively high voltage must be applied to the LEDs to drive the LEDs in a current control mode to avoid the foregoing trouble.

Thus, a plurality of LEDs cannot be driven so that all the LEDs shine in luminances in a predetermined luminance range by using a single boosting circuit. If an excessively high voltage is used for driving the LEDs in a current control mode the efficiency of the boosting circuit decreases.

SUMMARY OF THE INVENTION

Accordingly, it is an object of the present invention to provide an LED-switching controller and an LED-switching control method capable of efficiently switching on a plurality of parallel-connected LEDs.

An LED-switching controller in a first aspect of the present invention measures the voltages of signal lines connected to a plurality of LEDs, specifies the signal line at a minimum voltage excluding not connected terminals on the basis of measured voltages, and controls a boosting circuit so that the signal line at the minimum voltage is set at a voltage that enables a constant-current circuit to perform a constant-current operation. Therefore, the signal lines not connected to the LEDs must be determined. If the voltages of the signal lines of the plurality of LEDs are higher than a voltage indicating the disconnected LEDs, it is decided that there are not any terminals not connected to the LEDs. Since the output of the boosting circuit varies, it is possible, in some cases, that the voltages are lower than the voltage indicating the disconnected state. Therefore, an LED terminal monitoring circuit decides whether or not the LEDs are connected upon the increase of the output of the boosting circuit to a predetermined maximum.

In the LED switching controller in the first aspect of the present invention, the constant-current circuit supplies a driving current lower than a predetermined driving current in a period preceding a time point when the LED terminal monitoring circuit completes a decision on the connected state of the LEDs. If the driving current is high, the increase of the output of the boosting circuit having a limited supply capacity takes time at any measuring part. The output of the boosting circuit can be rapidly increased by controlling the constant-current circuit so as to supply a driving current lower than the desired driving current, and the decision of the disconnected state can be early completed. Since voltage drop at each LED is small and the voltage at the voltage measuring part increases, it is decided that the voltage will early and surely increase beyond the voltage indicating the disconnected state. If even a low driving current is supplied, the LED not connected terminals may remain in the disconnected state. However, the LED not connected terminals needs to be grounded if the driving current is completely stopped.

In the LED-switching controller in the first aspect of the present invention, the decision of the disconnected state is ended upon the increase of the voltages of the signal lines of the LEDs beyond the predetermined voltage indicating the disconnected state of the LEDs. The decision of the disconnected state can be early ended because the LEDs become the disconnected state if the voltages of the signal lines of at least the plurality of LEDs are higher than the voltage indicating the disconnected state of the LEDs.

The technique that controls the boosting operation of the boosting circuit to provide the voltage necessary for driving the plurality of LEDs in a current control mode is not necessarily limited to the LED-switching controller and it can be readily understood that the technique can be an LED-switching control method.

An LED-switching control method in a second aspect of the present invention that creates a voltage necessary for driving a plurality of parallel-connected LEDs in a current control mode by a boosting circuit and applies the voltage to the plurality of LEDs, and drives the plurality of LEDs by a constant-current circuit in a current control mode includes measuring the voltages of signal lines connected to the plurality of LEDs, specifying the signal line at the minimum voltage excluding not connected terminals on the basis of measured voltages, and controlling the boosting circuit so that the signal line at the minimum voltage is set at a voltage that enables the constant-current circuit to perform a constant-current operation.

Thus the present invention provides both the LED-switching controller and the LED-switching control method.

The LED-switching controller and the LED-switching control method according to the present invention are capable of applying the voltage necessary for driving the plurality of LEDs in a current control mode to the plurality of LEDs, of controlling the plurality of LEDs so that the respective luminances of the plurality of LEDs are distributed in a narrow luminance range, and of controlling the plurality of LEDs so that none of the plurality of LEDs may not be switched on.

BRIEF DESCRIPTION OF THE DRAWINGS

The above and other objects, features and advantages of the present invention will become more apparent from the following description taken in connection with the accompanying drawings, in which:

FIG. 3 is a diagram of an LED-switching control procedure to be carried out by the LED-switching controller shown in FIG. 1;

DESCRIPTION OF THE PREFERRED EMBODIMENTS

First Embodiment

Figure 1:
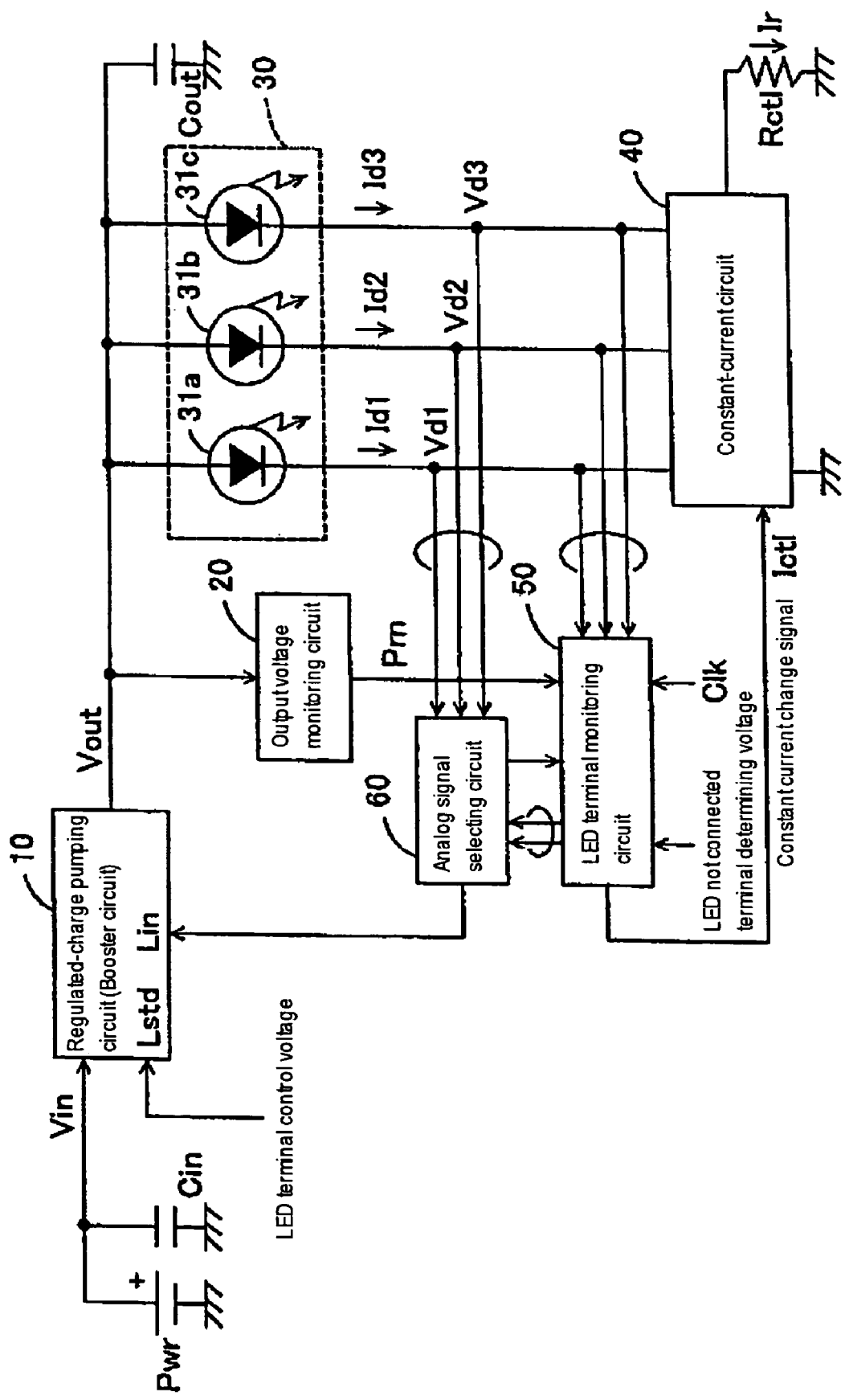
FIG. 1 is a block diagram of an LED-switching controller in a first embodiment according to the present invention.

Referring to FIG. 1 showing an LED-switching controller in a first embodiment according to the present invention, a regulated charge pumping circuit (hereinafter referred to as "boosting circuit") 10 has an input terminal connected to a dc power supply $P_{wr}$ and an input capacitor $C_{in}$, and an output terminal connected to an output capacitor $C_{out}$. The boosting circuit 10 has an LED terminal control voltage input terminal $L_{std}$ and an LED terminal voltage input terminal $L_{in}$. The boosting circuit 10 performs a boosting operation on the basis of an input voltage applied to the LED terminal voltage input terminal $L_{in}$ and an LED terminal control voltage applied to the LED terminal control input terminal $L_{std}$.

An output voltage monitoring circuit 20 monitors the output voltage $V_{out}$ of the boosting circuit 10. Upon the increase of the output voltage $V_{out}$ to a predetermined maximum voltage, the output voltage monitoring circuit 20 provides an output monitoring signal $P_{rn}$. An LED circuit 30 including three white diodes (hereinafter, referred to simply as "LEDs") 31a, 31b and 31c is connected to an output line connected to the output terminal of the boosting circuit 10. The LEDs 31a to 31c have anodes and cathodes connected, respectively, to the output line and a constant-current circuit 40. The constant-current circuit 40 controls currents flowing through the LEDs 31a to 31c so that a fixed current flows through the LEDs 31a, 31b and 31c. A resistance $R_{ct1}$ for setting a set current that flows through the LEDs 31a to 31c is connected to the constant-current circuit 40. A constant-current changing signal $I_{ct1}$ to decrease the currents flowing through the LEDs 31a to 31c below the set current is given when a disconnection decision is made.

Signal lines connected to the cathodes of the LEDs 31a to 31c are connected to an LED terminal monitoring circuit 50. The LED terminal monitoring circuit 50 performs a current control operation for controlling the current regulated by the constant-current circuit 40, an LED connection confirming operation for confirming the connection of the LEDs 31a to 31c, and an LED specifying operation for specifying the LED to which the minimum voltage is applied among the LEDs 31a to 31c excluding disconnected ones.

The configuration of the LED terminal monitoring circuit 50 will be described later. The output monitoring signal $P_{rn}$ provided by the voltage monitoring circuit 20, a disconnected LED terminal determining voltage serving as a reference voltage for deciding whether or not the LEDs 31a to 31c are connected, and a clock signal $C_{lk}$ for timing operations are given to the LED terminal monitoring circuit 50. A minimum voltage selection signal is given to an analog signal selecting circuit 60.

The analog signal selecting circuit 60 includes analog switches. The cathodes of the LEDs 31a to 31c are connected to the analog signal selecting circuit 60. A switching circuit of the analog signal selecting circuit 60 corresponding to one of the LEDs 31a to 31c selected by a minimum voltage selection signal provided by the LED terminal monitoring circuit 50 is closed to connect the selected LED to the LED terminal voltage input terminal $L_{in}$ of the boosting circuit.

Figure 2:
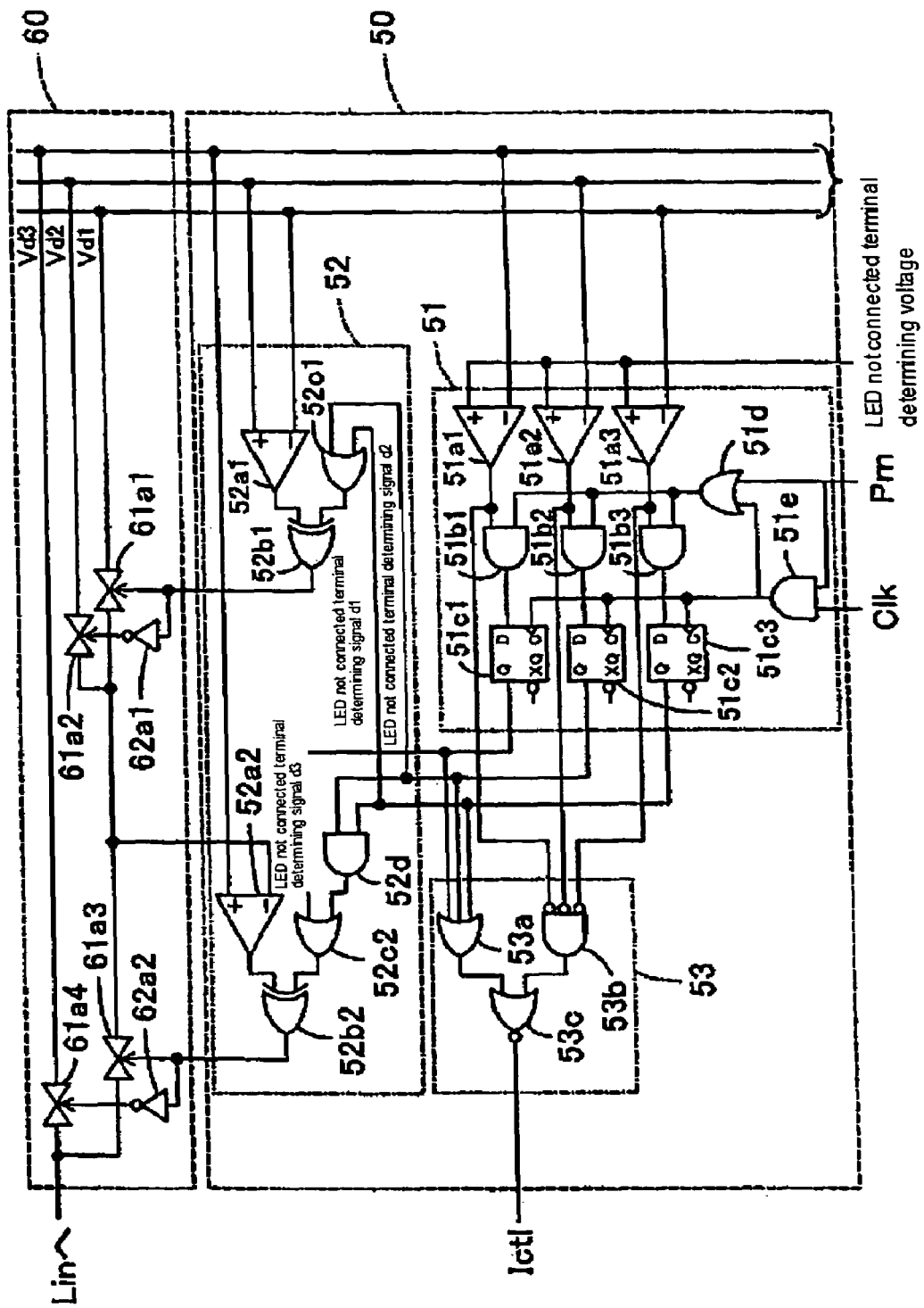
FIG. 2 is a block diagram of an LED terminal monitoring circuit included in the LED-switching controller shown in FIG. 1.

FIG. 2 shows a boosting control signal generating circuit consisting of the LED terminal monitoring circuit 50 and the analog signal selecting circuit 60. The LED terminal monitoring circuit 50 includes a not connected terminal determining block 51, a minimum voltage selecting block 52 and a constant-current change signal determining block 53. The not connected terminal determining block 51 includes three comparators $51a_1$, $51a_2$ and $51a_3$ comparing potentials $V_{out}-V_a$, $V_{out}-V_b$ and $V_{out}-V_c$ with an LED not connected terminal determining voltage. AND circuits $51b_1$, $51b_2$ and $51b_3$ apply the results of comparison to flip-flop circuits $51c_1$, $51c_2$ and $51c_3$ when the output monitoring signal $P_{rn}$ is provided. The flip-flop circuits $51c_1$ to $51c_3$ provides Q outputs as disconnection determining signals $d_1$, $d_2$ and $d_3$ indicating the disconnection of the LEDs 31a to 31c.

Results of comparison of the potentials $V_{out}-V_a$, $V_{out}-V_b$ and $V_{out}-V_c$ with the LED disconnection terminal determining voltage by the three comparators $51a_1$ to $51a_3$ are given to the constant-current change signal determining block 53. The not connected terminal determining operation is terminated upon the increase of all the potentials $V_{out}-V_a$, $V_{out}-V_b$ and $V_{out}-V_c$ beyond the LED not connected terminal determining voltage.

The minimum voltage selecting block 52 and the analog signal selecting circuit 60 are paired. The analog signal selecting selects the lowest one of the potentials $V_{out}-V_a$, $V_{out}-V_b$ and $V_{out}-V_c$ indicated by two outputs provided by the lowest voltage selecting block 52.

The minimum voltage selecting block 52 includes comparators $52a_1$ and $52a_2$, exclusive OR circuits $52b_1$ and $52b_2$, OR circuits $52c_1$ and $52c_2$ and an AND circuit $52d$. The minimum voltage selecting block 52 receives the three potentials $V_{out}-V_a$, $V_{out}-V_b$ and $V_{out}-V_c$ and three disconnection determining signals d1, d2 and d3, and the two exclusive OR circuits $52b_1$ and $52b_2$ provide outputs indicating a not disconnected signal line at the lowest potential. The disconnection determining signals d1 to d3 are inputs to a logic circuit that excludes properly decisions made by the comparator $52a_1$ that compares the potentials $V_{out}-V_a$ and $V_{out}-V_b$ and the comparator $52a_2$ that compares the lower one of the potentials $V_{out}-V_a$ and $V_{out}-V_b$ and the $V_{out}-V_c$.

The analog signal selecting circuit 60 includes four analog switches $61a_1$, $61a_2$, $61a_3$ and $61a_4$, and inverters $62a_1$ and $62a_2$. The analog signal selecting circuit 60 receives the two outputs of the exclusive OR circuits $52b_1$ and $52b_2$, and gives the lowest one of the potentials $V_{out}-V_a$ and $V_{out}-V_b$ and the $V_{out}-V_c$ to the boosting circuit 10.

FIG. 3 shows an LED-switching control procedure to be carried out by the LED-switching controller shown in FIG. 1. In step 1, a main switch, not shown, is closed. In step 2, the LED terminal monitoring circuit 50 sends the constant-current change signal $I_{ct1}$ to the constant-current circuit 40 to supply a minimum current $I_{min}$ lower than a desired current to the LEDs. The minimum current $I_{min}$ and a regular current $I_{reg}$ meet condition expressed by the following expressions.

$$I_{min}=I_r \times 5$$

$$I_{reg}=I_r \times 100$$

In step 3, the boosting circuit 10 starts a boosting operation. The output voltage $V_{out}$ increases gradually to the maximum voltage.

In step 4-1, the output voltage monitoring circuit 20 determines whether or not the output voltage $V_{out}$ is equal to the maximum voltage. Since the output voltage $V_{out}$ is lower than the maximum voltage in at an initial stage, the output monitoring signal $P_{rn}$ is not given.

Meanwhile, in step 4-2, the LED terminal monitoring circuit 50 compares the voltages of the LEDs 31a to 31c and the LED disconnection determining voltage. If the output voltage $V_{out}$ of the boosting circuit 10 is not sufficiently high, it is possible that the cathode voltages f the LEDs are lower than the not connected terminal determining voltage. The output voltage $V_{out}$ of the boosting circuit 10 increases gradually. In this state, currents flowing through the LEDs are lower than a desired current. In a normal state where the LEDs 31a to 31c are connected, the cathode voltages of the LEDs 31a to 31c increase gradually to potentials expressed by the following expressions.

LED 31a: $Vd_{1=Vout}-V_a$

LED 31b: $Vd_{2=Vout}-V_b$

LED 31c: $Vd_{1=Vout}-V_c$

The LED terminal monitoring circuit 50 compares the potentials $V_{out}-V_a$ and $V_{out}-V_b$ and the $V_{out}-V_c$ with the LED not connected terminal determining voltages. If the LEDs 31a to 31c are connected, driving currents flows through the LEDs 31a to 31c, and the input of the LED terminal monitoring circuit 50 must be at the potentials $V_{out}-V_a$ and $V_{out}-V_b$ and the $V_{out}-V_c$. Those potentials are higher than the ground potential and lower than the minimums of the expected potentials $V_{out}-V_a$ and $V_{out}-V_b$ and the $V_{out}-V_c$. If the LEDs 31a to 31c can be driven, the potentials $V_{out}-V_a$ and $V_{out}-V_b$ and the $V_{out}-V_c$ are necessarily higher than the LED not connected terminal determining voltage, and the LED terminal monitoring circuit 50 makes a determination accordingly.

If the LEDs 31a to 31c are not connected, any driving currents do not flow. Therefore, the potential of the input of the LED not connected terminal determining voltage is equal to the ground potential. The LED not connected terminal determining voltage is lower than the lowest one of the potentials $V_{out}-V_a$ and $V_{out}-V_b$ and the $V_{out}-V_c$ and higher than the ground potential. Therefore, if any one of the LEDs 31a to 31c is not connected, the input of the LED terminal monitoring circuit 50 remains at the ground potential and the LED terminal monitoring circuit 50 makes a determination accordingly.

The timing of the determination by the LED terminal monitoring circuit 50 is important because the potentials $V_{out}-V_a$ and $V_{out}-V_b$ and the $V_{out}-V_c$ are necessarily lower than the LED not connected terminal determining voltage immediately after the start of operation of the boosting circuit 10 even if the LEDs 31a to 31c are connected. The LED terminal monitoring circuit 50 makes the foregoing determination on the basis of the two following conditions.

Condition 1: The output voltage monitoring circuit 20 provides the output monitoring signal $P_{rn}$ on the basis of the output voltage $V_{out}$.

Condition 2: All the potentials $V_{out}-V_a$ and $V_{out}-V_b$ and the $V_{out}-V_c$ are higher than the LED not connected terminal determining voltage even before the output monitoring signal $P_{rn}$ is provided.

Timing based on Condition 1 specifies a time point when it is expected that the output voltage of the boosting circuit 10, in principle, will not increase any more. Basically, it is impossible that the LEDs are not driven even if the output voltage of the boosting circuit 10 increased to the maximum voltage. Therefore, it can be determined that the LEDs 31a to 31c are not connected if the potential at the input of the LED terminal monitoring circuit 50 is not higher than the LED not connected terminal determining voltage even though the output voltage of the boosting circuit 10 is the maximum voltage.

Timing based on Condition 2 specifies a time point earlier than that specified by timing based on Condition 1. Even before the output voltage of the boosting circuit 10 reaches the maximum voltage, the potentials $V_{out}-V_a$ and $V_{out}-V_b$ and the $V_{out}-V_c$ can be higher than the LED not connected terminal determining voltage if a voltage high enough to drive the LEDs 31a to 31c in a current control mode. It is possible to determine that all the LEDs 31a to 31c are connected when the potentials $V_{out}-V_a$ and $V_{out}-V_b$ and the $V_{out}-V_c$ are higher than the LED not connected terminal determining voltage, and hence the LED terminal monitoring circuit 50 does not need to withhold the determination.

Thus, the LED terminal monitoring circuit 50 determines whether or not the LEDs are connected on the basis of the two conditions. The LED at the lowest one of the potentials $V_{out}-V_a$ and $V_{out}-V_b$ and the $V_{out}-V_c$ among the connected LEDs 31a to 31c is selected, and a minimum voltage selection signal is given to the analog signal selecting circuit 60. The LED terminal monitoring circuit 50 gives the constant-current change signal $I_{cr1}$ to the constant-current circuit 40 after making the foregoing determination to supply the desired driving current $I_{reg}$.

In step 5, the analog signal selecting circuit 60, namely, an analog switch, connects the signal line connected to the cathode of the LED specified by the minimum voltage selecting signal among the LEDs 31a to 31c to the LED terminal voltage input terminal $L_{in}$ of the boosting circuit 10.

In step 6, the boosting circuit 10 performs the boosting operation on the basis of the respective potentials of the LED terminal voltage input terminal $L_{in}$ and the LED terminal control voltage input terminal $L_{std}$. If it is determined that the potential of the LED terminal voltage input terminal $L_{in}$ is not sufficiently high relative to the potential of the LED terminal control voltage input terminal $L_{std}$, the boosting circuit 10 continues the boosting operation. A voltage necessary for the constant-current operation of the constant-current circuit 40 is created when the potential of the LED terminal voltage input terminal $L_{in}$ is sufficiently high relative to the potential of the LED terminal control voltage input terminal $L_{std}$. At this stage, the lowest one of the potentials $V_{out}-V_a$ and $V_{out}-V_b$ and the $V_{out}-V_c$ of the LEDs 31a to 31c is higher than the potential of LED terminal control voltage input terminal $L_{std}$. Consequently, all the LEDs 31a to 31c are at sufficiently high potentials relative to the potential of the LED terminal control voltage input terminal $L_{std}$. Thus it is possible to prevent the distribution of the respective luminances of the LEDs 31a to 31c in a luminance range wider than an allowable luminance range and the failure in switching on the LEDs due to the dispersion of the forward voltages applied to the LEDs.

Thus the LED terminal monitoring circuit 50 detects the LED at the lowest potential among the parallel-connected LEDs 31a to 31c, the analog signal selecting circuit 60 sends the signal indicating the lowest potential of the detected LED among the LEDs 31a to 31c to the boosting circuit 10, and then the boosting circuit 10 performs the boosting operation according to the signal indicating the lowest potential. Therefore, a voltage sufficient for driving the LEDs 31a to 31c in the current control mode can be applied to the LEDs 31a to 31c. Since signal lines not connected to the LEDs are excluded from objects of detection, malfunction does not occur.

Second Embodiment

Although the LED terminal monitoring circuit 50 of the LED-switching controller in the first embodiment is a hardware logic, the LED terminal monitoring circuit 50 can be realized by a software logic.

Figure 4:
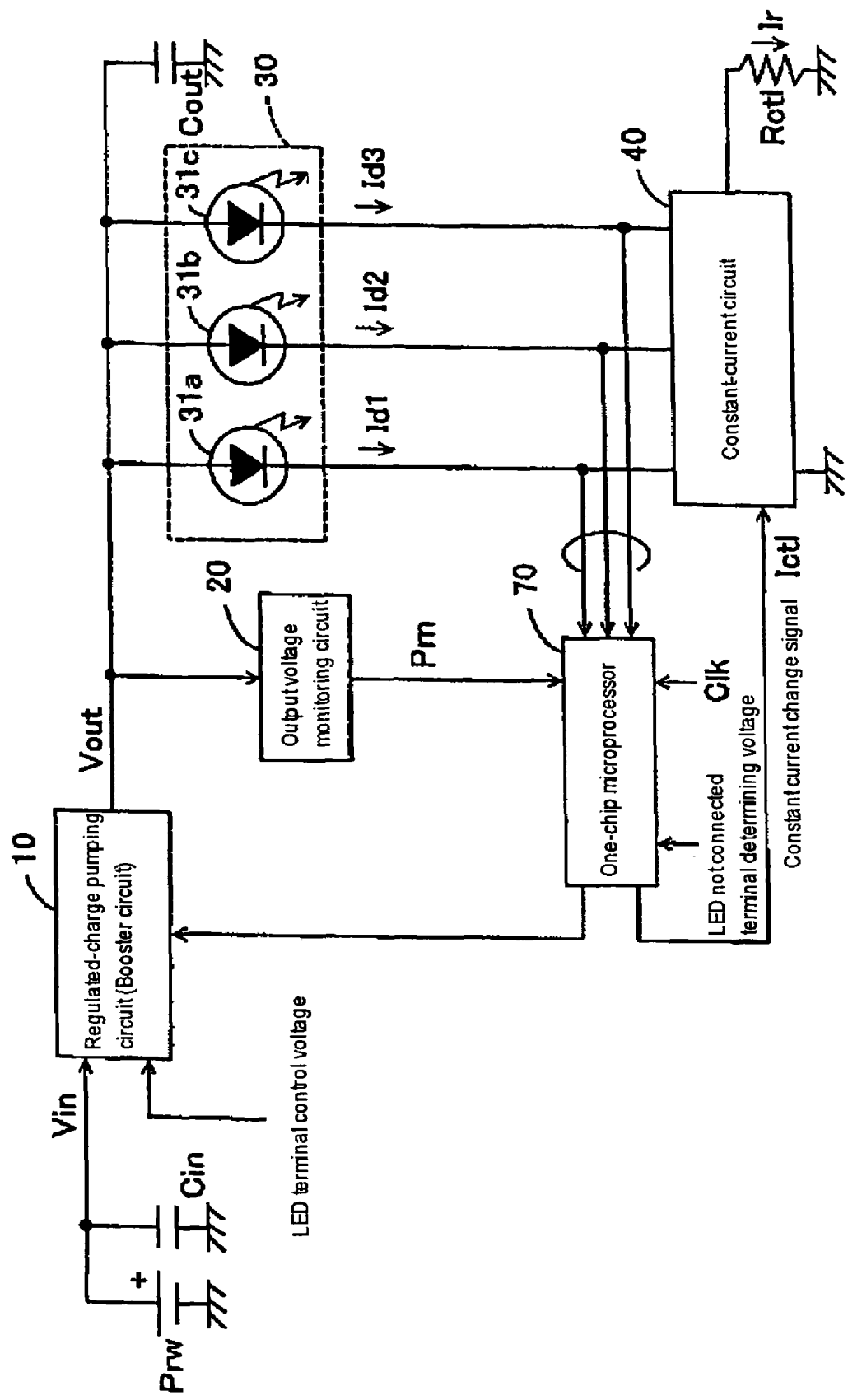
FIG. 4 is a block diagram of an LED-switching controller in a second embodiment according to the present invention.

FIG. 4 is a block diagram of an LED-switching controller in a second embodiment according to the present invention. The LED-switching controller in the second embodiment is provided with a one-chip microprocessor (hereinafter, referred to simply as "microprocessor") 70 having functions corresponding to those of the LED terminal monitoring circuit 50 and the analog signal selecting circuit 60 of the LED-switching controller in the first embodiment.

The microprocessor 70, similarly to the LED terminal monitoring circuit 50, has three input terminals, namely, A/D conversion ports. Signal lines connected to the cathodes of LEDs 31a, 31b and 31c are connected to the input terminals of the microprocessor 70. The microprocessor 70 obtains digital data corresponding to the respective potentials $V_{out}-V_a$ and $V_{out}-V_b$ and the $V_{out}-V_c$ of the LEDs 31a to 31c through the A/D conversion of the potentials $V_{out}-V_a$ and $V_{out}-V_b$ and the $V_{out}-V_c$. Since the analog signal selecting circuit 60 is omitted, the microprocessor 70 has a D/A conversion port, namely, an output terminal, to give a signal representing a predetermined voltage to the LED terminal voltage input terminal $L_{in}$ of a boosting circuit 10. Although an LED not connected terminal determining voltage is given to the microprocessor 70 through the A/D conversion port, digital data on the LED not connected terminal determining voltage may be given to the microprocessor 70 because the LED not connected terminal determining voltage is a fixed value.

Figure 5:
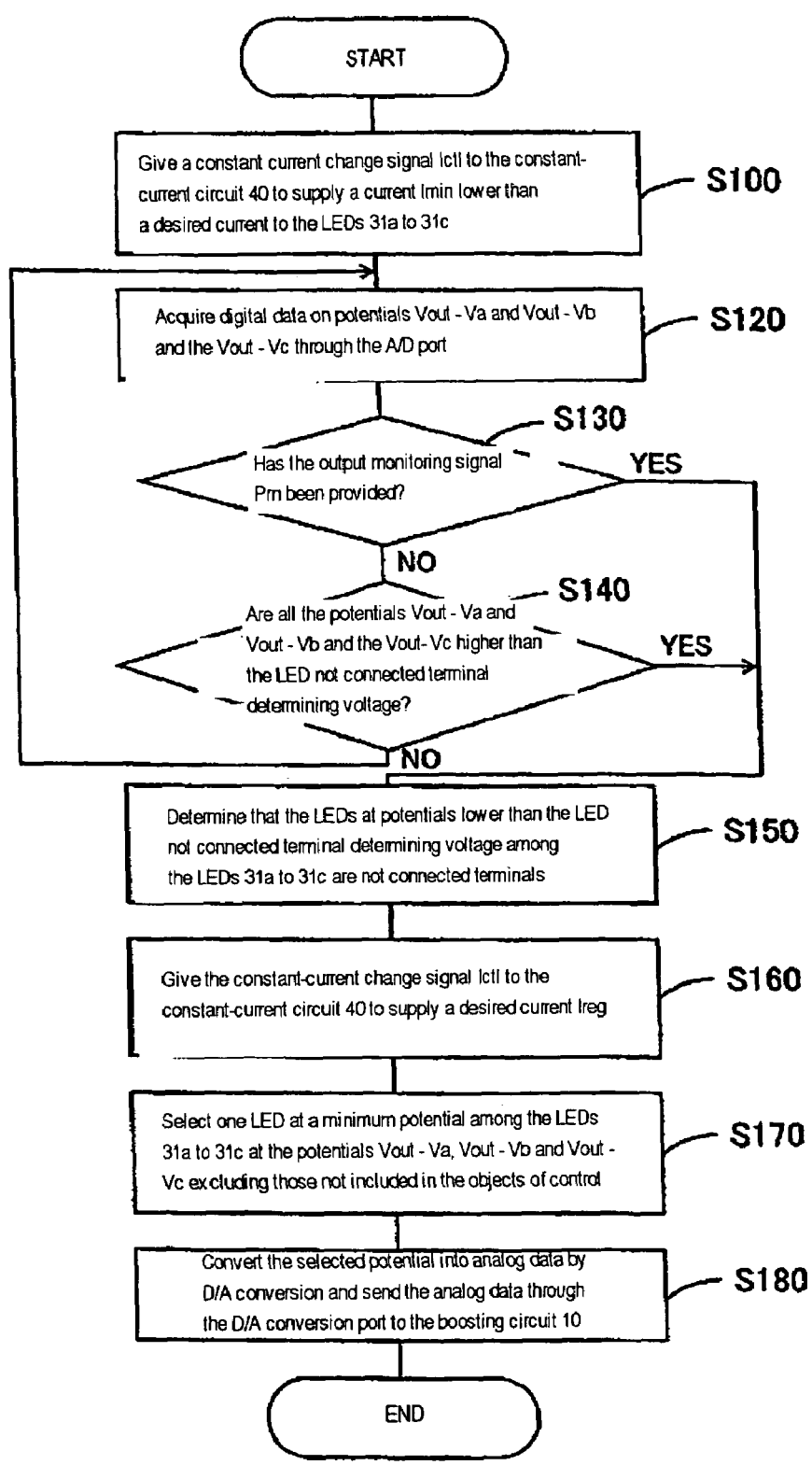
FIG. 5 is a flow chart of an LED-switching control procedure to be carried out by the LED-switching controller shown in FIG. 4.

FIG. 5 is a flow chart of a program to be executed by the microprocessor 70.

In step S100, the microprocessor 70 gives a constant-current change signal $I_{ctl}$ to a constant-current circuit 40 to supply a current $I_{min}$ lower than a desired current to LEDs 31a to 31c. The boosting circuit 10 starts a boosting operation like that explained in connection with the first embodiment. An output voltage monitoring circuit 20 determines whether or not an output voltage $V_{out}$ is a maximum.

In step S120, digital data on potentials $V_{out}-V_a$ and $V_{out}-V_b$ and the $V_{out}-V_c$ is applied to the A/D port to prepare for the determination as to whether or not the LEDs 31a to 31c are connected. The timing of determination is the same as that by which the LED terminal monitoring circuit 50 makes determination. The determination is made at a time point when the output voltage monitoring circuit 20 provides an output monitoring signal $P_{rn}$ on the basis of the output voltage $V_{out}$ or at a time point when all the potentials $V_{out}-V_a$ and $V_{out}-V_b$ and the $V_{out}-V_c$ are higher than an LED not connected terminal determining voltage.

A query is made in step S130 to see if the output monitoring signal $P_{rn}$ has been provided. A query is made in step S140 to see if all the potentials $V_{out}-V_a$ and $V_{out}-V_b$ and the $V_{out}-V_c$ are higher than the LED not connected terminal determining voltage. If the response to either of the queries made in steps A130 and S140 is affirmative, the LEDs at potentials lower than the LED not connected terminal determining voltage among the LEDs 31a to 31c are determined to be not connected terminals in step S150, and the not connected terminals are excluded from objects of the following control operations. Those not connected terminals can be specified by flags or the like.

In step S160, the microprocessor 70 gives the constant-current change signal $I_{ctl}$ to the constant-current circuit 40 to supply a desired current $I_{reg}$, namely, a regular driving current.

In step S170, one LED at a minimum potential among the LEDs 31a to 31c at the potentials $V_{out}-V_a$ and $V_{out}-V_b$ and the $V_{out}-V_c$ excluding those not included in the objects of control is selected. Instep S180, the selected potential is converted into analog data by D/A conversion and the analog data is sent through the D/A conversion port to the boosting circuit 10. The boosting circuit 10 performs the boosting operation on the basis of the potential of the LED terminal voltage input terminal $L_{in}$ given thereto by the microprocessor 70 and the voltage of the LED terminal control voltage input terminal $L_{std}$.

Thus the microprocessor 70 detects the LED at the lowest potential among the parallel-connected LEDs 31a to 31c and gives signals indicating the voltages of the LEDs 31a to 31c to the boosting circuit 10 on the basis of the result of detection. The boosting circuit 10 performs the boosting operation according to the signal representing the thus selected lowest voltage. Consequently, a voltage sufficient to drive the LEDs 31a to 31c in a current control mode can be surely applied to all the LEDs 31a to 31c. Since signal lines not connected to the LEDs are excluded from objects of detection, malfunction does not occur.

As apparent from the foregoing description, the boosting circuit is able to apply a driving voltage sufficient for surely driving the plurality of LEDs to all the LEDs. Since signal lines not connected to the LEDs are excluded from objects of detection, malfunction does not occur. If some of the LEDs are omitted as the occasion demands, the control operation ignores the omitted LEDs automatically. Therefore, the LED-switching controller is very flexible.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An LED-switching controller for applying a voltage necessary for driving a plurality of parallel-connected LEDs in a current control mode, said LED-switching controller comprising:

a boosting circuit having an output voltage control function, capable of performing a controlled boosting operation for boosting a predetermined dc voltage to apply a voltage necessary for driving the plurality of LEDs in current control mode;

an LED circuit with a plurality of parallel connected LEDs is coupled with an output terminal of the boosting circuit;

an output voltage monitoring circuit for monitoring an output voltage of the boosting circuit, providing an output monitoring signal when the output voltage of the boosting circuit is increased to a predetermined maximum voltage;

an LED terminal monitoring circuit that performs current control operation for controlling a current regulated by a constant-current, that confirms an LED connection operation for confirming the connection of the plurality of parallel connected LEDs; and that performs an LED specifying operation for specifying the LED to which a minimum voltage is applied;

the LED terminal monitoring circuit confirms connection operation by determining a connection state of the LED of the plurality of parallel connected LEDs;

the LED terminal monitoring circuit determines the connection state of the LED by determining if the output voltage of the boosting circuit is at the predetermined maximum voltage based on a receipt of the output monitoring signal and if the signal line voltage of the signal line to which the LED is coupled is higher than a reference voltage;

if it is determined that any one of the output voltage of the boosting circuit is at the predetermined maximum and the signal line voltage of the signal line to which the LED is coupled is higher than the reference voltage, the LED is determined as connected by the LED terminal monitoring circuit;

the LED terminal monitoring circuit further specifies the signal line that is connected to the LED that has the lowest signal line voltage among signal line voltages that are connected to the LEDs, excluding LEDs determined as not connected;

an analog signal selecting circuit for providing a signal indicating the specified signal line with the lowest signal line voltage to the boosting circuit; and the constant-current circuit for driving the plurality of LEDs in the current control mode based on the boosting operations.

2. The LED-switching controller according to claim 1, wherein the constant-current circuit supplies a driving current lower than a predetermined driving current in a period preceding a time point when the LED terminal monitoring circuit completes a decision on the connected state of the LEDs.

3. The LED-switching controller according to claim 2, wherein the LED terminal monitoring circuit terminates a not connected terminal determining operation upon the increase of voltages of all the LEDs beyond a voltage indicating a not connected state of the LEDs.

4. An LED-switching control method that creates a voltage necessary for driving a plurality of parallel-connected LEDs in a current control mode by a boosting circuit and applies the voltage to the plurality of LEDs, and drives the plurality of LEDs by a constant-current circuit in a current control mode, said LED-switching control method comprising the steps of:

monitoring an output voltage of a boosting operation to provide an output monitoring signal when the output voltage of the boosting operation is increased to a predetermined maximum voltage;

measuring signal line voltages of signal lines with which the plurality of LEDs are coupled based on a connection state of an LED of the plurality of LEDs, determined by a receipt of the output monitoring signal;

specifying a signal line from the signal lines at a minimum voltage, excluding not connected LEDs on the basis of measured voltages; and controlling the boosting circuit so that the signal line at the minimum voltage is set at a voltage that enables the constant-current circuit to perform a constant-current operation.

5. A method for controlling Light Emitter Diodes (LEDs), comprising:

providing a current lower than a predetermined driving current to a plurality of parallel coupled LEDs;

acquiring a potential difference across an LED of the plurality of parallel coupled LEDs by determining a signal line voltage of a signal line to which an LED is coupled;

monitoring an output voltage of a boosting operation to provide an output monitoring signal when the output voltage of the boosting operation is increased to a predetermined maximum voltage;

determining a connection state of the LED of the plurality of parallel coupled LEDs by:

determined if the output voltage of the boosting operation is at the predetermined maximum voltage based on a receipt of the output monitoring signal;

if it is determined that the output monitoring signal is not received, it is determined if potential difference of the signal line voltage of the signal line to which the LED is coupled is higher than a reference voltage;

if it is determined that the potential difference of the signal line voltage, of the signal line to which the LED is coupled is not higher than the reference voltage, reacquiring the potential difference across LEDs;

otherwise, if it is determined that the output monitoring signal is received, the LEDS with potential difference lower than the reference voltage is determined as not connected;

further, if it is determined that the potential difference of the signal line voltage of the signal line to which the LED is coupled is higher than the reference voltage, the LEDS with potential difference lower than the reference voltage is determined as not connected;

excluding the LED determined as not connected, providing the predetermined driving current to the plurality of parallel coupled LEDs that are connected; measuring signal line voltages of signal lines with which the plurality of LEDs are coupled, and selecting the signal line that has the lowest signal line voltage among signal line voltages that are connected to the LEDs; and providing the selected signal line voltage for boosting operations that generates voltage necessary for driving the plurality of parallel coupled LEDs in a current control mode.

* * * * *